United States Patent [19]
Kihlberg

[11] Patent Number: 5,222,521
[45] Date of Patent: Jun. 29, 1993

[54] HYDRAULIC VALVE
[75] Inventor: Markus C. Kihlberg, Blasdell, N.Y.
[73] Assignee: Moog Controls, Inc., E. Aurora, N.Y.
[21] Appl. No.: 879,895
[22] Filed: May 8, 1992
[51] Int. Cl.$^5$ .................... F15B 13/042; F16K 3/24
[52] U.S. Cl. .................... 137/625.69; 137/625.66; 251/368
[58] Field of Search .................... 137/625.66, 625.69; 251/368

[56] References Cited
U.S. PATENT DOCUMENTS

| | | | |
|---|---|---|---|
| 2,985,566 | 5/1961 | Tsien et al. | 251/368 X |
| 3,685,965 | 8/1972 | McClure | 251/368 X |
| 4,337,797 | 7/1982 | Caruso | 137/625.66 X |
| 4,593,719 | 6/1986 | Leonard | 137/625.66 |

FOREIGN PATENT DOCUMENTS 53-67075  6/1978  Japan ................ 137/625.69
59-106769 6/1984 Japan ................ 137/625.69

OTHER PUBLICATIONS
Mertz, M27/623 Servo Hydraulic Vibrator (advt), 1991.
Heaviquip, Hemi 50 Vibrator, 1990.

Primary Examiner—Gerald A. Michalsky
Attorney, Agent, or Firm—Wall and Roehrig

[57] ABSTRACT

A high speed high-performance valve member has a spool that is movable within a cylindrical cavity of a valve body or sleeve. The spool and sleeve are both formed of hardened stainless steel, but the bearing surfaces and lands of the spool are provided with a deposition layer of titanium nitride to give the bearing surface a hard smooth finish. The differential hardness between the spool and sleeve prevents galling. Damage due to cavitation is avoided, and the valve has a failure rate reduced by a factor of about twenty.

7 Claims, 1 Drawing Sheet

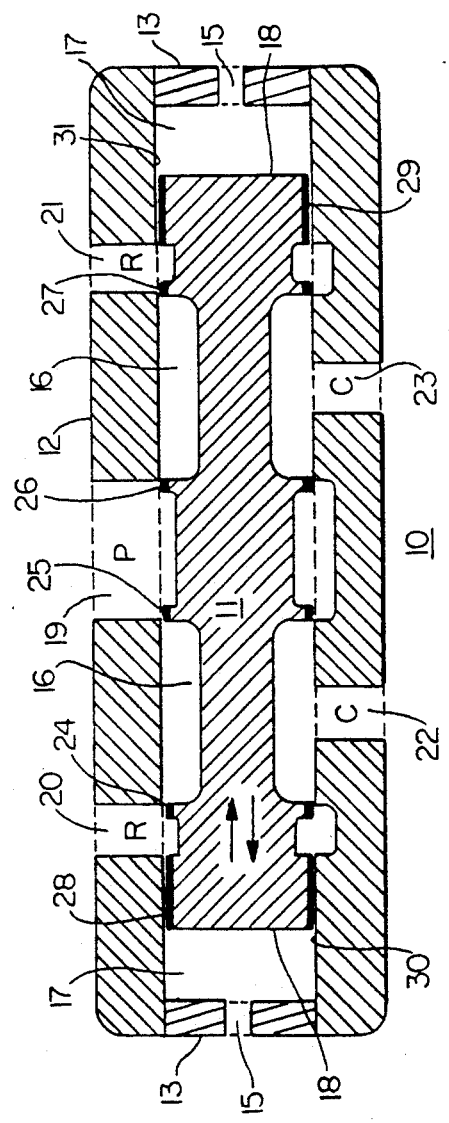

HYDRAULIC VALVE

BACKGROUND OF THE INVENTION

The present invention relates to hydraulic valves, and more particularly to spool-type valve, such as hydraulic servo valves, of high dynamic response in which the spool member is moved at high velocities relative to its associated sleeve or bushing member.

Spool type valves are frequently employed in two-stage hydraulic servo valves, in which the spool position is adjusted to modulate the fluid flow through the body of the valve. These valves are quite generally known, and are described, for example in U.S. Pat. Nos. 3,103,739; 3,228,423; 3,257,911; and 4,337,797.

In these devices, there is a spool member provided with lands and bearings and a valve body, i.e., sleeve or bushing, with a generally cylindrical cavity in which the spool is slidably mounted. The lands and bearings of the spool member engage cooperating cylindrical surfaces of the cavity, and permit accurate axial movement of the lands relative to various ports in the valve body so that movement of the spool member accurately and repeatably controls the fluid flow through the valve body.

In high performance valves of this type where the spool member and the sleeve may encounter relative velocities greater than forty inches per second, the surfaces of the bearings and lands may chafe or gall on the mating cavity surfaces. This apparently occurs because of direct metal-to-metal contact between the relatively sliding members, especially in the vicinity of the bearings.

The conventional approach to this problem, particularly as described in U.S. Pat No. 4,337,797, is to provide a coating of a soft metal, such as copper, on the spool member bearing surface and elsewhere that sliding contact may be experienced. This soft material bonded to the bearing surface serves the purpose of absorbing and burying any microcontaminants that may be found in the hydraulic fluid. Providing the opposed sliding surfaces with widely separated hardnesses avoids adhesive contact such as galling between the surfaces.

Where valves of this type have been employed in a heavy-duty, high-speed, high-flow application, a high rate of failure has been experienced due to galled spools and bushings. Upon inspection of the failed valves it was discovered that there was damage to the soft copper surfaces caused by localized cavitation. The cavitation had resulted in erosion of the copper, and this permitted contact of the steel substrate with the steel surface of the valve body cavity, resulting in galling at high spool velocities.

Cavitation occurs when, because of the quick spool movement, the fluid pressure in a localized area falls below the vapor pressure of the fluid. This will result in the formation of gas bubbles within the fluid. As the fluid progresses to an area of higher pressure, the gas bubbles collapse, returning the gas into solution with the fluid. The collapse of the gas bubbles can result in pitting of the copper coating and resultant loss of bearing surfaces. High speed operation is also thought to result in localized loss of lubrication between the sliding members which could result in the attachment or welding of the parts commonly known as galling.

Because of this problem, the copper-plated bearing type spool valve is poorly suited for some applications, such as in seismographic exploration, i.e., vibrioses. In vibrioses, the typical frequency sweep of seismographic exploration vehicles exceeds 200 Hz. In one field evaluation, conventional copper-plated spools were found to fail after only four to eight hours of operation at 45 Hz.

Consequently, the industry has sought an improved valve construction which would avoid the above-noted problems attributed to cavitation and galling.

OBJECTS AND SUMMARY OF THE INVENTION

It is an object of this invention to provide a high-performance, high-speed spool type hydraulic valve which avoids the drawbacks of the prior art.

It is another object to provide a hydraulic valve which can enjoy a prolonged rough service life with a reduced risk of failure.

It is a further object to provide the valve with hard, wear resistant sliding surfaces that avoid erosion.

According to an aspect of the invention, a high-speed hydraulic valve comprises a body or sleeve member and a spool member that is slidably disposed in the sleeve member. The sleeve member has a generally cylindrical cavity with a number of ports for admitting or exhausting hydraulic fluid to or from the cavity. The spool member has one or more generally cylindrical lands with cylindrical faces engaging the cooperating portion of the cavity cylindrical surface. The lands cooperate with the ports of the valve sleeve member or body such that the relative position of the sleeve member and spool member define selected flow paths for the hydraulic fluid being metered by the valve. At one or both ends, or elsewhere on the spool member, there is a bearing surface that is supported on a bearing portion of the cavity of the sleeve member. The spool member has a coating of titanium nitride deposited on it to a suitable thickness between about 40 and 200 microinches, e.g. 80 microinches. The spool member and sleeve member are formed of stainless steel or other steel, with a Rockwell C (Rc) hardness of about 55 to 60. The TiN coating on the spool gives the lands and bearing surfaces a surface hardness of about 70 to 85. To avoid galling, the engaging surface should have harnesses that differ by about 10 Rc or more. The spool member can be coated using a standard industrial physical vapor deposition (PVD) technique.

It has been found that the titanium nitride has a relatively high hardness, and this has increased resistance to galling and microwelding. The TiN layer has excellent bonding characteristics, because the compound is bound tightly with little affinity for iron. Also, the TiN coating requires no machining or polishing after it is applied.

The PVD process is carried out at about 900° F. (480° C.), which has not adversely affected the steel of the spool member.

A hydraulic valve having a TiN coating spool member has been tested for over 100 hours of service at a 45 Hz rate, and no visible sign of wear or other damage was detected. On the other hand, similar valves with conventional, copper plated spools have a life expectancy of only about 4 to 8 hours under the same conditions.

Because of the hardness and smoothness of the titanium nitride coating, spool damage due to cavitation does not occur, and so the risk of erosion and subsequent galling is reduced enormously. With the principal cause of valve failure eliminated, the valves can be expected to have a twenty-fold increase in service life as compared with the conventional spool valves.

The above and many other objects, features, and advantages of this invention will present themselves to those of skill in the art from the ensuing description of a preferred embodiment, when read in conjunction with the accompanying Drawing.

BRIEF DESCRIPTION OF THE DRAWING

The sole drawing figure is a longitudinal sectional view of a spool-type hydraulic valve, constructed according to one preferred embodiment of the invention.

DETAILED DESCRIPTION OF A PREFERRED EMBODIMENT

Shown here in the Figure is an improved valve assembly 10 wherein a spool member 11 is slidably mounted within a conventional sleeve or bushing 12. Here the sleeve 12 is in the form of a tubular cylinder with left and right closure plates or plugs 13, each of which has a central aperture 15 through which fluid may be introduced into or withdrawn from a generally cylindrical bore or cavity 16. The apertures 15 communicate with left and right chambers 17 defined between the closure plates 13 and respective ends 18 of the spool member 11.

The apertures are joined to not-shown one or more stage hydraulic amplifier, and a differential pressure is applied therefrom onto the spool 11 in a well-know manner to displace the spool member 11 in a desired direction within the sleeve 12.

The sleeve 12 is provided with a number of radial openings or ports 19, 20, 21, 22, 23 which communicate fluid flow to the inside of the cavity. Here, there is a central pressure port 19, left and right return or drain ports 20, 21 and left and right control ports 22, 23. The return ports 20, 21 communicate with a return or drain line. The pressure port 19 communicates with a pressure line or source of pressurized fluid, and the control ports 22, 23 are operatively coupled to an actuator (not shown) or other driven hydraulic device.

The sleeve member is preferably formed of a standard valve steel, such as 440C stainless steel having a Rockwell C hardness between about 55–65, preferably about 60.

The spool member 11 is of a three-lobed design with first land 24, a second land 25, a third land 26 and a fourth land 27 arranged on the spool member. Each of the lands has a generally cylindrical outer face which engages the cylindrical surface of the cavity 16, and which controls or gates fluid flow through the cavity 16 between the pressure port 19 and the control ports 22, 23 and between the control ports 22, 23 and the drain ports 20,21. The axial position of the spool member 11 relative to the sleeve member 12 governs the path and rate of fluid flow between the control ports 22, 23 and the driven device. The lands meter the flow of fluid, and so the outer edge of each land is ground accurately so as to coincide with the control edge of the corresponding supply or return port when the spool is in its null or central position. If the spool is displaced to one side or the other, a fluid path is opened between the pressure port 19 and the corresponding control port 22, 23, and another fluid path is opened between the return port 20 or 21 and the other of the control ports 23, 22. The size of displacement to left or right controls the volume of flow.

Here shown at left and right ends of the spool 11 are bearing surfaces 28,29 which are slidably supported on respective cylindrical surface portions 30,31 of the sleeve cavity. The bearing surfaces 28, 29 typically have a clearance of about 0.5 mils from the cavity wall.

Here, both the spool member 11 and the sleeve member 12 are formed of 440C stainless steel. The spool member bearing surfaces 28 and 29 as well as the outer cylindrical surfaces of the lands 24, 25, 26, 27 are provided with a coating of a wear resistant film, namely titanium nitride applied by physical vapor deposition. This coating is applied to a thickness of between about 50 and 200 microinches, preferably about 80 microinches. This depends somewhat on the deposition technique and is not strictly critical. The TiN has an inherent lubricity to prevent or delay the occurrence of galling if lubrication is interrupted. The TiN coating is hard with an effective Rockwell C hardness of 85, which will also tend to protect the spool from damage due to particulate contamination. The TiN coating is relatively inert, and does provide a modest amount of corrosion resistance.

By comparison, the hardness of the hardened stainless steel sleeve or bushing 12 is about 58 (Rockwell C). This satisfies the requirement that the mating surfaces of the spool and sleeve have a differential hardness of at least about ten (Rockwell C).

In one field evaluation, the valve of this invention, with the hardened stainless steel sleeve and the TiN coated spool was operated in a seismographic environment, and operated continuously at 45 Hz for over 100 hours. There was no visible sign of wear or damage to the spool or sleeve. By comparison, conventional valves with copper plated spools were also tested at 45 Hz, and all failed after only four to eight hours.

In addition to the low friction and anti-galling attributes of the TiN coating, the coating is quite even and has superior dimensional stability. No machining or polishing is required after coating. The smooth coating avoids the affects of cavitation of the fluid between the sleeve cavity and the working surfaces of the spool, even at high operating speeds.

In an alternative embodiment, the sleeve member cavity can be provided with a hardened coating, for example nickel boride.

While the invention has been described with reference to one preferred embodiment, it should be recognized that many modifications and variations would present themselves to those skilled in the art without departing from the scope and spirit of this invention, as defined in the following claims.

What is claimed is:

1. A high speed hydraulic valve comprising a sleeve member and a spool member slidably mounted within the sleeve member; the sleeve member including a cylindrical cavity having a cylindrical surface and a plurality of ports permitting flow of fluid into and out of said cavity, said sleeve member being formed of a steel that has a surface hardness of about 55 to 60 Rc; said spool member including at least one cylindrical land having a cylindrical surface facing said cavity cylindrical surface and cooperating with said sleeve member ports such that the relative position of said sleeve member and said spool member define selective flow paths for said fluid, and at least one cylindrical bearing surface engaging a portion of the cylindrical cavity surface of said sleeve member, said spool having applied onto its at least one land and its at least one bearing surface a coating of titanium nitride to a thickness of about 50 to 200 microinches, such that the land cylindrical surface and the bearing cylindrical surface have a surface hardness of at least 10 Rc greater than the engaging surfaces of said sleeve member.

2. The high-speed hydraulic valve of claim 1 wherein said titanium nitride coating has a hardness of about 82 Rc.

3. The high-speed hydraulic valve of claim 1 wherein said spool member has a pair of said bearing surface disposed on opposite ends thereof, with both of said pair having said titanium nitride coating.

4. The high-speed hydraulic valve of claim 1 wherein said sleeve member cavity is provided with a coating to increase its surface hardness.

5. The high-speed hydraulic valve of claim 4 wherein said coating includes nickel boride.

6. The high-speed hydraulic valve of claim 1 wherein said titanium nitride coating is a physical vapor deposition.

7. The high-speed hydraulic valve of claim 1 wherein said titanium nitride coating is applied onto all surfaces of said spool which face said sleeve member cavity.

* * * * *